United States Patent [19]

Hori et al.

[11] Patent Number: 4,701,977
[45] Date of Patent: Oct. 27, 1987

[54] HINGE STRUCTURE FOR VEHICLE

[75] Inventors: Yasuaki Hori, Yokohama; Masayoshi Kishima, Atsugi, both of Japan

[73] Assignees: Nissan Motor Company, Limited; Ohi Seisakusho Company, Limited, both of Yokohama, Japan

[21] Appl. No.: 851,218

[22] Filed: Apr. 14, 1986

[30] Foreign Application Priority Data

Jul. 15, 1985 [JP] Japan .................................. 60-154340

[51] Int. Cl.⁴ ................................................ E05D 7/10
[52] U.S. Cl. ......................................... 16/266; 16/386
[58] Field of Search ................. 16/259, 266, 277, 273, 16/386

[56] References Cited

U.S. PATENT DOCUMENTS

| 875,251 | 12/1907 | Field | 16/273 |
| 2,878,639 | 3/1959 | Cline | 16/266 |
| 3,610,460 | 10/1971 | Siklos | 16/266 |
| 4,614,004 | 9/1986 | Oshida | 16/82 |

FOREIGN PATENT DOCUMENTS

| 0148708 | 2/1955 | Switzerland | 16/342 |
| 0022963 | of 1906 | United Kingdom | 16/266 |

Primary Examiner—Nicholas P. Godici
Assistant Examiner—Karen Skillman
Attorney, Agent, or Firm—Schwartz, Jeffery, Schwaab, Mack, Blumenthal & Evans

[57] ABSTRACT

A hinge structure comprises a projecting shaft having an side-flattened ovaloid cross-section and secured either on both ends of the gate or on the gate holding sections on the loading bed gate which oppose the ends of the gate, a support member in the shape of a tube with a bottom secured on the other side of the ends of the gate and the gate holding sections and engaged with the projecting shaft in a relatively freely rotating manner, a slot provided in one part of a cylindrical section on the support member, through which the projecting shaft can pass only when the gate is positioned at a specific inclined position relative to the loading bed, so that removal and insertion are obtained in the side direction from the support member.

12 Claims, 13 Drawing Figures

HINGE STRUCTURE FOR VEHICLE

BACKGROUND OF THE INVENTION

1. Field of the Invention

The present invention relates to the structure of a loading or tail gate hinge device for a vehicle, and in particular to the structure of the loading or tail gate hinge device through which the gate is removably mounted to a loading bed of the vehicle.

2. Description of the Related Art

Conventionally, a hinge for a removable loading or tail gate on a truck is of a type indicated, for example, in Japanese Utility Model Publication of Examined Application No. SHO52-14852, wherein a hinge plate secured to a chassis side and a hinge plate secured to the loading or tail gate side are connected by means of a freely rotatable hinge pin.

On one of these hinge plates, an almost tubular hinge pin support section with a slot parallel to the hinge pin is formed, and for example, the gate together with the other hinge plate and the hinge pin can be removed in the axial direction of the hinge pin only at the time when the gate is opened to the point when it hangs straight down perpendicularly from the truck loading bed, due to the fact that one part of the other hinge plate passes through the slot.

Because such a hinge structure is the type which receives any load on the gate through the pin, it is difficult to apply it to large models because of strength limitations. Therefore, increased strength must be provided through the increased thickness of the hinge plate, and new problems occur such as poor processing characteristics of the plate. In addition, the operation of installing the loading gate is troublesome because of the difficulty of positioning the pin in the axial direction while maintaining the loading gate in position. In addition, connecting pins as well as hinge plates are necessary for the hinge structure, which is undesirable because of the number of parts required.

In order to make it easy to install and remove the gate on the loading bed with this type of conventional device, the fitting parts by which the hinge plate on the loading bed and the hinge pin are engaged to each other, and the engaging parts for both hinge plates and the like, must be provided with a certain degree of play. As a result, when the gate is closed, it is shaky, and shifts in the transverse direction, giving rise to such problems as incomplete engagement of the gate locking device.

In addition, during installation or removal, it is necessary to move the gate horizontally in the axial direction while supporting the weight of the gate. Especially when installing the gate, the tips of the left and right hinge pins which are secured to the gate must be engaged with the hinge pin holding, section on each of the loading bed hinge plates almost simultaneously, so that the installation and removal operations become very troublesome.

SUMMARY OF THE INVENTION

An object of the present invention is to provide, with due consideration to the drawbacks of such conventional devices, a hinge structure by which the loading gate is easily installed or removed, and which has adequate strength.

A further object of the present invention is to provide a loading bed gate hinge device on a truck which solves all the above problem areas, and with which it is possible to preserve adequate play in the engaging parts at the time the gate is installed or removed, and in which, when the gate is moved into the closed position, there is no play between the engaging parts and the gate is reliably held in a fixed position.

In order to accomplish these objects in the present invention, in a structure provided comprising a support member with a holding section which has a substantially annular wall section with a slot or cut-out at a part thereof provided on either the chassis side or the gate side, and a mating projecting member, which mates with the holding section in a freely rotatable manner, provided on the other side. There is provided a flattened section in the projecting member for insertion of the projecting member through the slot or cut-out into the holding section of the support member.

On the bottom section of the support member, a raised section is provided so that when the gate is in the closed position, the projecting member slidingly contacts the end surface of the projecting shaft, and when the gate is in the inclined position for insertion and removal of the gate, the projecting member is removed from the end surface of the projecting shaft.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENTS

Now referring to FIGS. 1 through 6, the details of one embodiment of the present invention will be explained.

Figure 1:
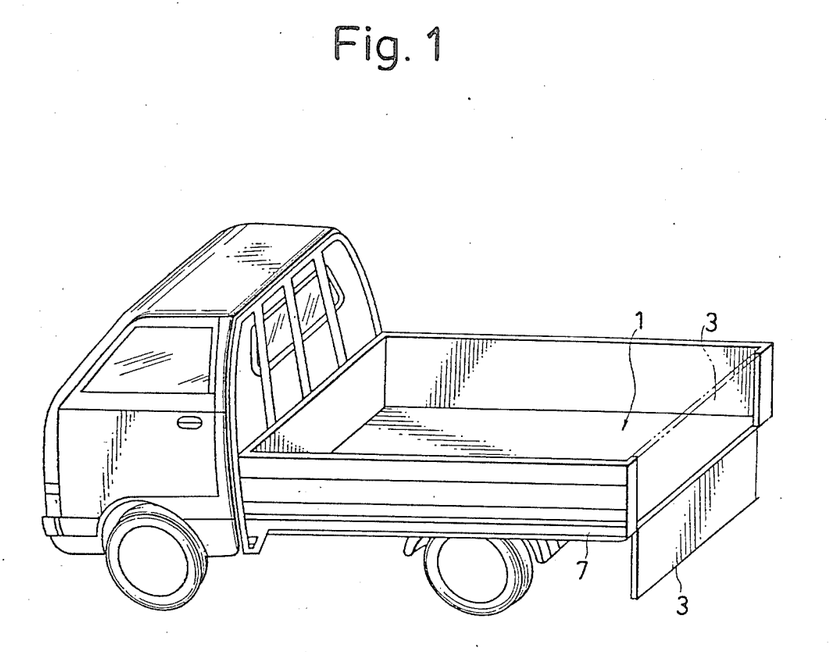
FIG. 1 is a perspective view of a truck showing the structure of a hinge device of the present invention.
Figure 2:
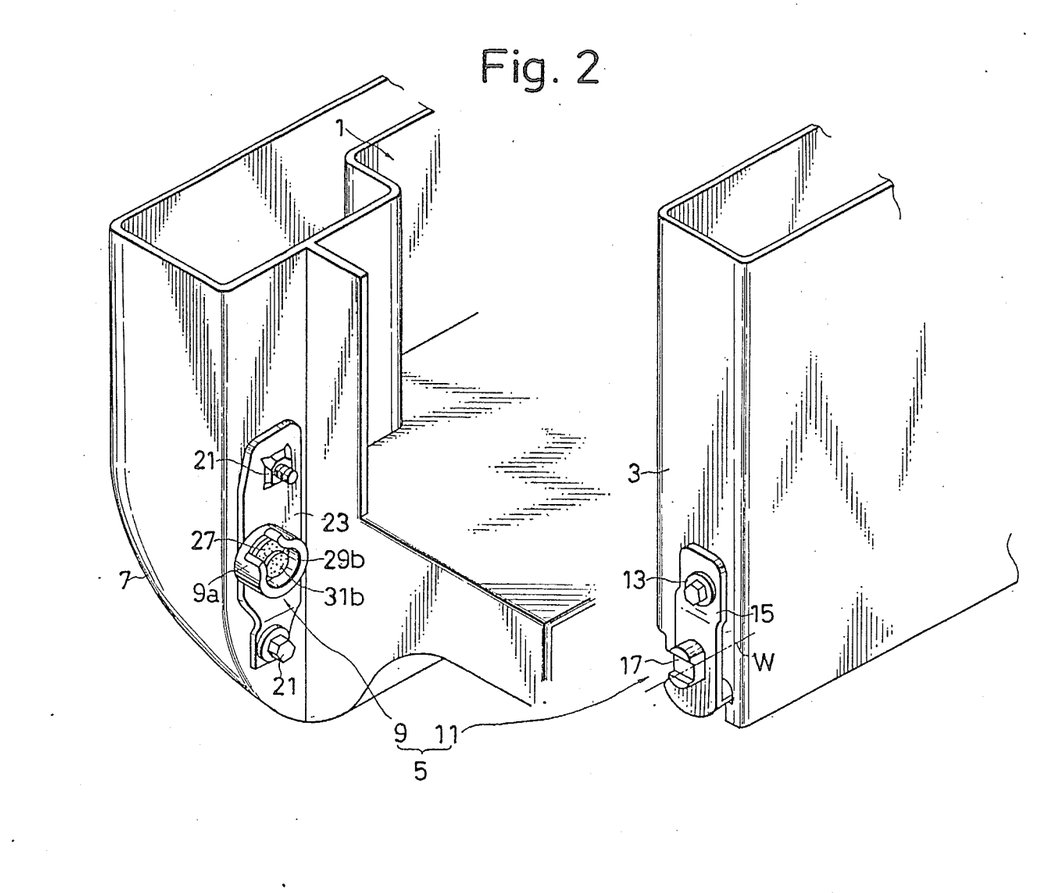
FIG. 2 is an exploded perspective view from the rear of a corner section of the loading bed of a truck on which a tail gate equipped with a hinge device of the present invention is pivotally mounted.

FIG. 1 shows a loading gate or tail gate 3 of a loading bed 1 of a truck. In the lateral direction of the loading gate 3, as shown in FIG. 2, the tail gate 3 is supported on the loading bed 1 in a freely rotatable manner through a hinge device 5, and when the tail gate 3 is closed (as indicated by the chain line in FIG. 1), it is maintained in the locked status by means of a lock mechanism (not shown in the drawings).

Figure 3:
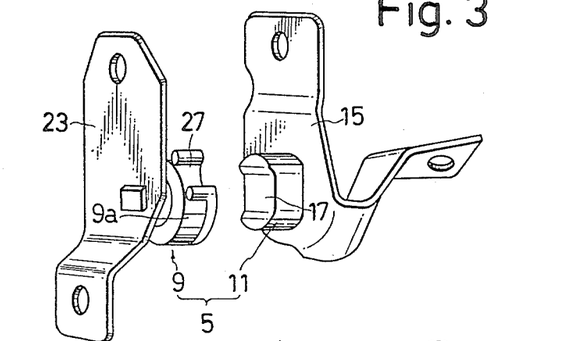
FIG. 3 is a perspective view of of a hinge device of the present invention.
Figure 4:
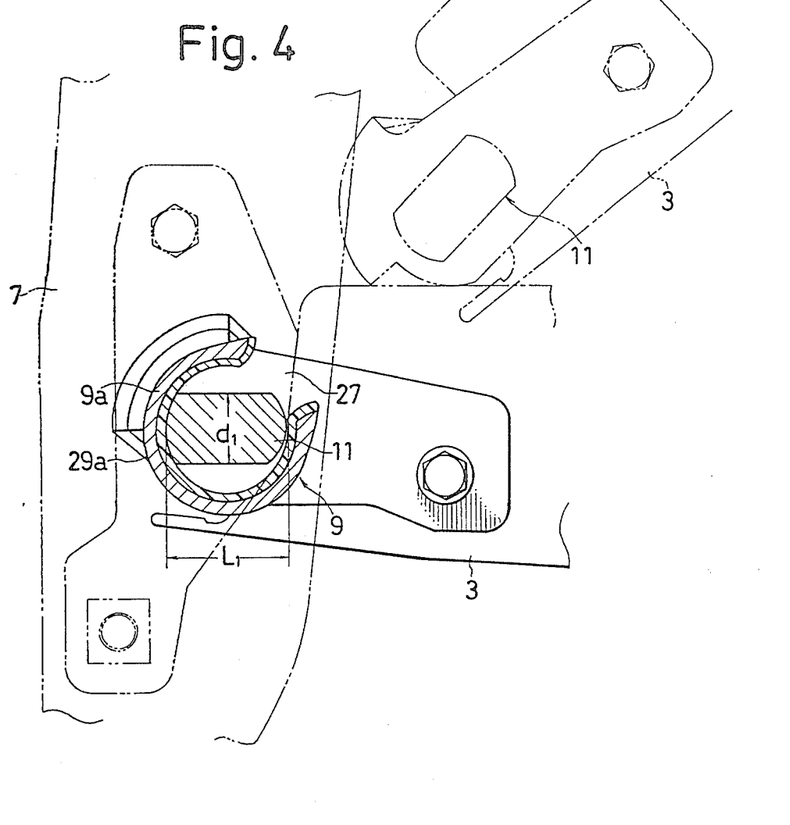
FIG. 4 is a partly cross sectional side view of a hinge device of the present invention.

The hinge device 5 comprises a support member 9 which is secured to a chassis 7 (loading bed side) and a projecting member 11 which is secured to the tail gate 3 and mates in a freely rotatable manner with the support member 9.

The projecting member 11 is formed in a side flattened ovaloid shape, that is in a substantially cylindrical shaft with a pair of opposed arcuate sections cut-away, and is welded to a base plate 15 bolted to the tail gate 3 with a bolt means 13. A narrow or thinned section is formed across the diameter of the projecting member 11 by chamfering on the projecting member 11 wherein the width $d_1$ is smaller than the diameter $L_1$ of the projecting member 11. In addition, on the top or end surface of the projecting member 11, a concave section 17 which is slotted in the direction transverse to the axial center line W of the projecting member 11 is formed so that it does not interfere with the head of a securing pin which will be later described.

The support member 9 is formed in a substantially C-shape or annular shape with a slot or cut-out 27 at a part thereof to have a holding section 9a in the circumferential direction. It is secured on a base plate 23 through a securing rivet 25 which is bolted to the chassis 7 by a bolt means 21. The slot is provided for insertion of the projecting member 11.

Figure 6:
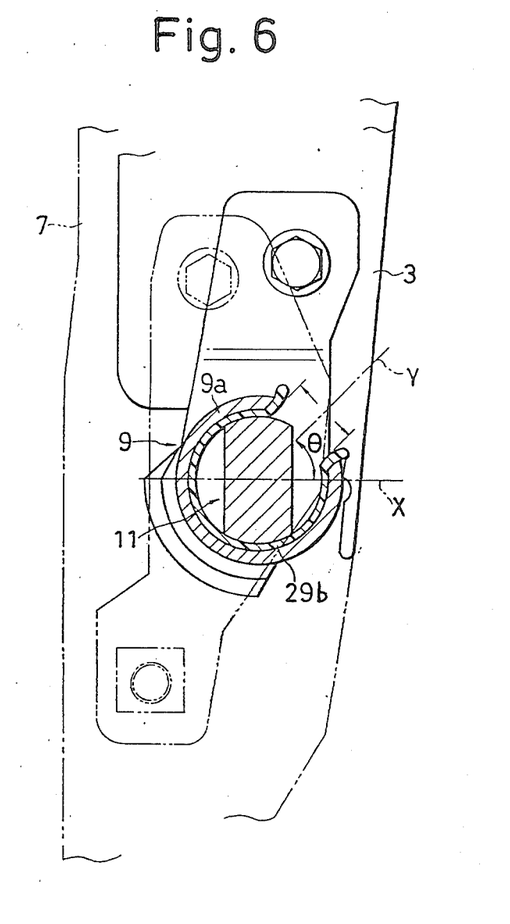
FIG. 6 is a cross sectional view taken along the line VI—VI in FIG. 5.

On the holding section 9a of the support member 9, the insertion slot or cut-out 27 is faced along an inclined line Y which is at an angle $\theta$ <theta> of almost 45 degrees relative to a horizontal line X, as shown in FIG. 6. It will be noted that through this insertion slot or cut-out 27, the projecting member 11 is only able to be installed and removed in the direction of the inclined line Y.

Figure 5:
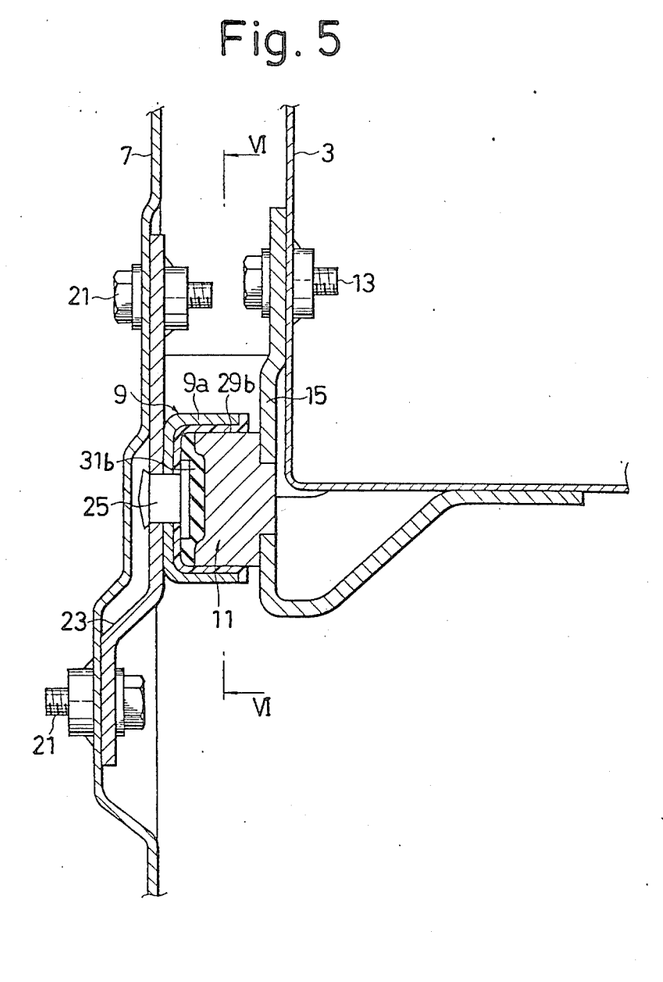
FIG. 5 is a cross sectional view showing the mating status of a hinge device of the present invention.

The slot or cut-out 27 has a width slightly larger than the narrow width section of the projecting member 11, so that the projecting member 11 is inserted through the slot into the support member 9. On the inner side of annular wall 29a and the bottom section 31a of the holding section 9a, a plurality of buffers 29b and 31b are provided for preventing direct contact with the metal of the projecting member 11.

In the hinge structure formed in this manner, when installing the tail gate 3, first the narrow width section of the projecting member 11 is positioned to meet the insertion slot 27 of the holding section 9a. At this time the tail gate 3 is inclined in the upward direction, as shown by chain lines in FIG. 4. That position is maintained while the projecting member 11 is dropped into the insertion slot 27 and then the projecting member 11 and the holding section 9a mate in a freely rotatable manner. During this time, the buffers 29b and 31b are vertical and act to regulate the noise related to play in the back-front and lateral directions, thereby providing an improvement in the impression of quality. In addition, because there is substantially no play in the lateral direction when the tail gate 3 is closed, no position deviation occurs and the activation of the locking mechanism (not shown in the drawings) is accurately carried out. The projecting member 11 cannot be withdrawn in the vertical or lateral directions and is accurately supported.

As explained above, with the hinge structure of the present invention having just two parts—the support member and the projecting member—the number of parts can be reduced. In addition, the loading gate can be easily installed and removed, and increased strength is provided when it is engaged.

Now referring to FIGS. 7 to 13, another embodiment of the present invention will be explained.

Figure 7:
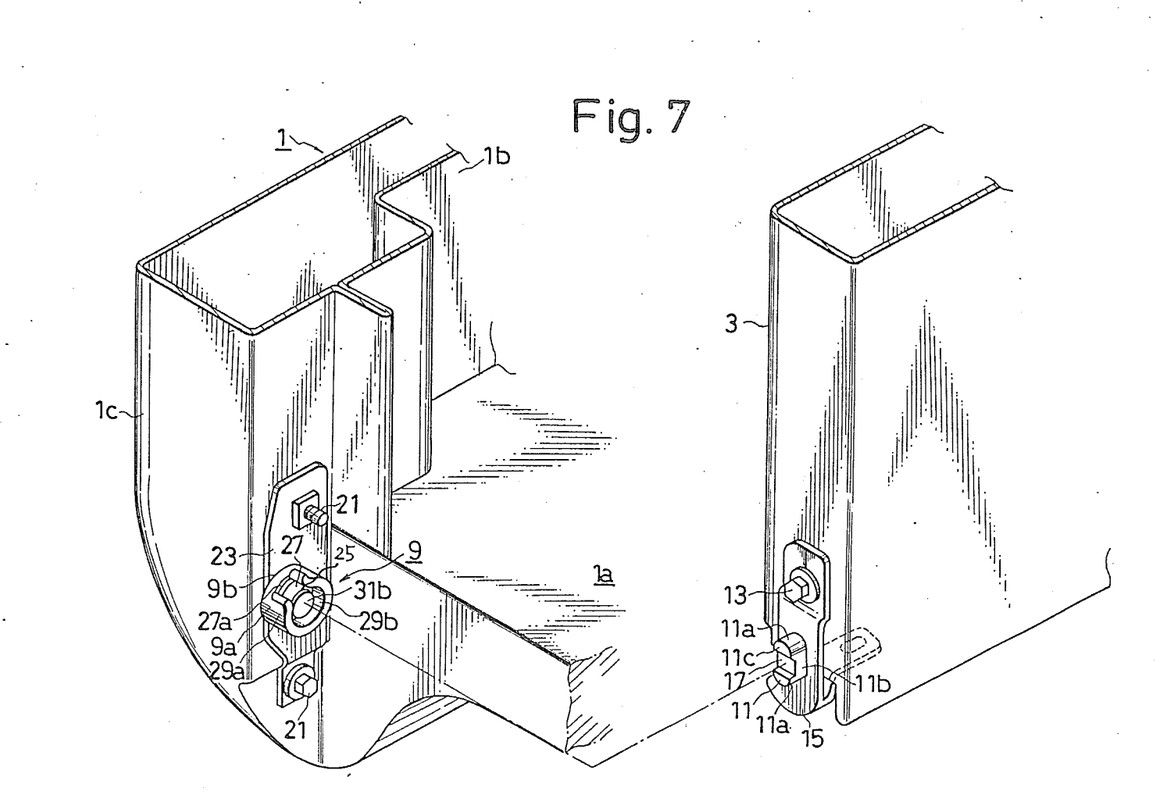
FIG. 7 is an exploded perspective view substantially identical to FIG. 2.

FIG. 7 shows a configuration almost identical to that shown in FIG. 2. However, a detailed explanation will be given in relation to FIGS. 8 to 13. A loading bed 1 comprises a floor plate 1a, a plurality of fixed side plates 1b provided on both sides of the floor plate 1a, a pair of lateral gate supporting sections 1c (only one is shown in the drawings) connected to the back end of each side plates 1b and slightly protruding in the rear direction from the rear end surface of the floor plate 1a, and an opening and closing type of loading or tail gate 3 positioned between the left and right gate supporting sections 1c. It has a hinge device 5 of the present invention which is pivotally provided at the lower end section of the gate.

Figure 8:
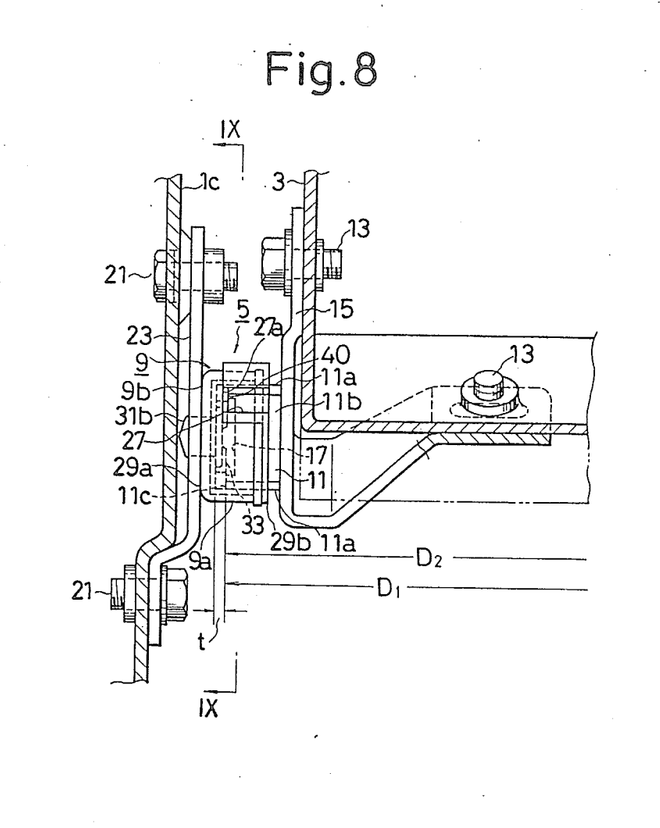
FIG. 8 is a vertical cross sectional view from the rear of the main part of the assembly status of a hinge device of the present invention.

The hinge device 5 comprises a mounting plate 15 secured to a bottom end section of the tail gate 3 with a bolt means 13, a mounting plate 23 which opposes the mounting plate 15 and is secured to the inside surface of the gate supporting section 1c by a bolt means 21, a projecting member 11 with a side-flattened ovaloid cross-section which is secured to an outer side surface of the mounting plate 15 on the side of tail gate 3 and protrudes in the outer direction from the respective mounting plate 15, and a support member 9, in the substantially C-shape of a tube with a bottom, which engages with the projecting member 11 in a relatively freely rotatable manner and is secured to the side of mounting plate 23.

In this hinge device 5, each of these members are provided in pairs on both side sections of the tail gate 3, with a symmetrical left and right construction, but only one member from each pair is shown on the drawings.

On the outer circumference of the projecting member 11, a pair of upper and lower arcuate or arc-shaped surfaces 11a, whose curvature corresponds almost exactly to the curvature of the inner surface of the support member 9, and a pair of flat side surfaces 11b which are mutually parallel are formed. A concave section 17 is formed at the center position of the top or end surface 11c of the projecting member 11.

On the projecting member 11, the long axis L of the side-flattened ovaloid cross-section is directed in the longitudinal direction of the end surface of the tail gate 3. In addition, the central distance $L_1$ between the two arc-shaped surfaces 11a on the projecting member 11 is almost the same as the inner diameter $L_2$ of the support member 9, or is slightly smaller.

The support member 9 comprises a metallic tubular bottom-equipped body 29a on the outer circumference, and a hard plastic layer 29b insertedly fixed onto the inner surface of the support member 9, all of which become an integral unit, forming a tubular section 9a and a bottom section 9b. The bottom section 9b is secured to the mounting plate 23 by means of a rivet 25.

One part of the tubular section 9a of the support member 9 is open in the upper rear direction of the loading bed 1, and a slot 27 is formed running from the open end of the support member 9 to the bottom section 9b.

The open part of the slot 27 is covered by a hard plastic layer 29b. The dimension d2 of the opening in the direction of the circumference is almost the same as the distance d1 between the two parallel flat side surfaces 11b of the projecting member 11, or is slightly larger.

Figure 10:
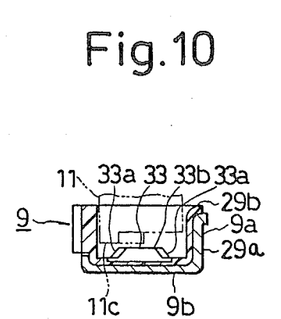
FIG. 10 is a cross sectional view taken along the line X—X in FIG. 9.

On the inner surface of the hard plastic layer 29b on the bottom section 9b of the support member 9, a pair of arc-shaped or fan-shaped raised sections 33 on which are provided a gently sloping surface 33a on both ends, are positioned at 180 degrees to each other from the center of the inner surface of the bottom section 9b.

Figure 9:
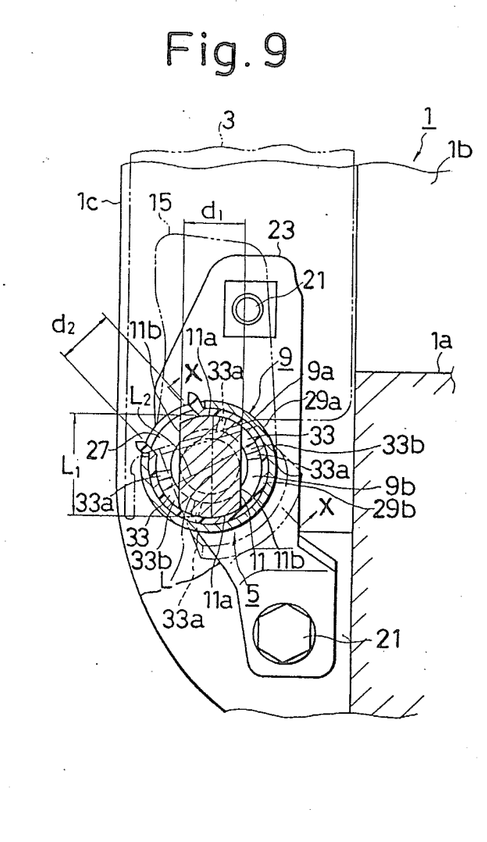
FIG. 9 is a vertical cross sectional view taken along the line IX—IX in FIG. 8, showing the tail gate in the closed position.
Figure 11:
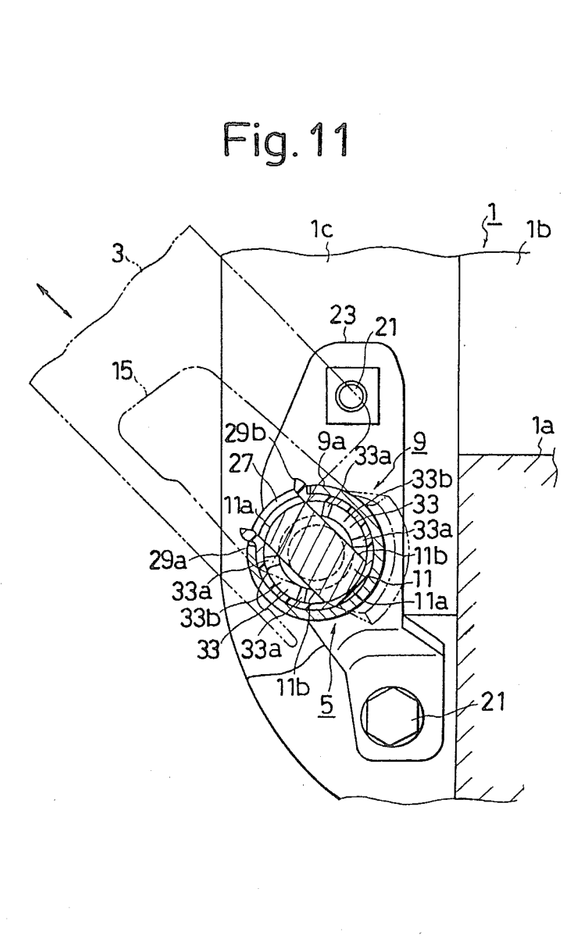
FIG. 11 is a cross sectional view corresponding to FIG. 9 showing the tail gate in the installation/removal position.

The relative position of the raised sections 33 on the bottom section 9b of the support member 9 when the tail gate 3 is straight up in the closed position, as shown in FIG. 9, is such that each of the end surfaces 11c on the projecting member 11 slidingly comes into contact with the raised sections 33. In addition, as shown in FIG. 11, when the tail gate 3 is positioned in a specific slanting position facing upward and backward from the loading bed 1, and the projecting member 11, passing through the slot 27 assumes a position from which it is possible to remove it from the support member 9 (the position of the tail gate 3 and the projecting member 11 at this time is hereafter referred to as the installation-removal position), the end surface 11c of the projecting member 11 is in a position which allows it to be removed from the raised section 33.

Figure 12:
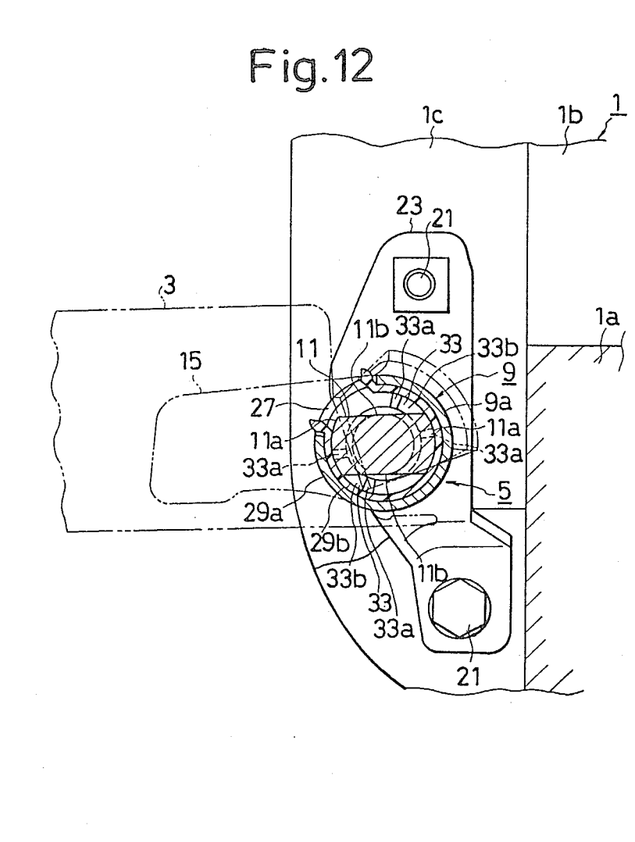
FIG. 12 is a vertical cross sectional side view corresponding to FIG. 9 showing the tail gate in the horizontal position.
Figure 13:
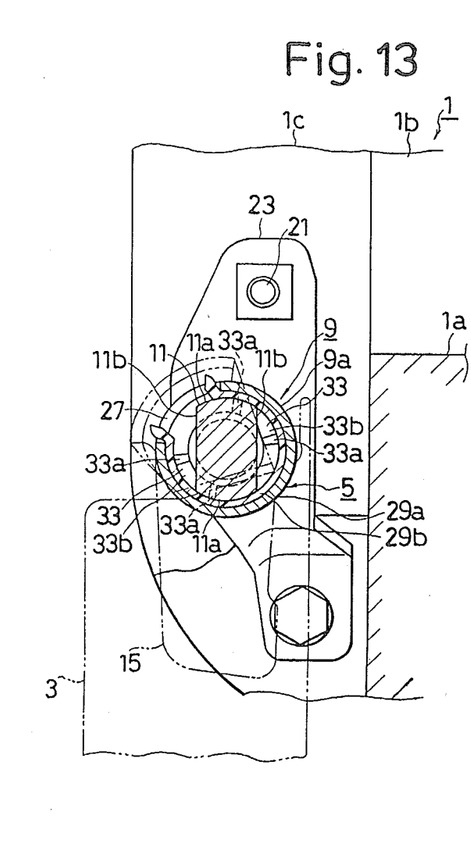
FIG. 13 is a cross sectional view corresponding to FIG. 9 showing the tail gate hanging straight down.

In this embodiment of the present invention, as shown in FIG. 12, when the tail gate 3 is opened to the horizontal position, and as shown in FIG. 13, also when the tail gate 3 is opened to the position where it faces straight down from the loading bed 1, the end surfaces 11c of the projecting member 11 slidingly contact the raised sections 33.

The distance D1 between the head surfaces 33b of the raised sections 33, which mutually oppose the left and right support members 9, is almost the same as the distance D2 of the end surface 11c of the projecting member 11 on both ends of the tail gate 3.

As a result, when the tail gate is in the installation-removal position, assuming that the height from the bottom section 9b of the left and right raised sections 33 is taken as t, a gap for play corresponding to the sum of the heights of the left and right raised sections, that is 2t, is created for insertion and removal of the tail gate 3 specifically between the end surface 11c of the projection member 11 and a back edge 27a of the slot 27 or the bottom section 9b of the support member 9. The insertion and removal action relative to the support member 9 of the projecting member 11 passing through the slot 27 can then be comfortably accomplished.

This embodiment of the present invention is constructed as outlined above so that by placing the tail gate 3 at the same slope as the installation-removal position and causing both the left and right projecting members 11 to pass through the respective slots 27 and engage the support members 9, the tail gate 3 can easily be installed on the loading bed 1.

From this status, as shown in FIG. 9, when the tail gate 3 is rotated as far as the closed position, each of the projecting members 11 rotates in the respective support member 9 and its end surface 11c slidingly contacts the raised section 33. The tail gate 3 is maintained accurately in the pre-determined standard position between the left and right gate supporting sections 1c by the centering action of the raised section 33.

Accordingly, in this status, when the lock pin (omitted from the drawings) on the gate lock mechanism is inserted into a matching orifice (omitted from the drawings) formed in the upper portion of the gate supporting section 1c to lock the tail gate 3, the play in the lateral direction of the tail gate 3 is accurately prevented by the left and right raised sections 33. There is therefore no worry of the lock pin coming out of the matching orifice.

When the tail gate 3 is opened, the gate lock mechanism is released in the same way as for conventional tail gates. The upper edge of the tail gate 3 may be rotated to face in the lower rear direction.

When the tail gate 3 goes past the installation-removal position, the load on the tail gate acts to press down the left and right projecting members 11 so that the projecting members 11 do not pass through the slots 27 and separate from the support members 9.

Then, by rotating the tail gate 3 even further in the lower direction, the tail gate 3 will assume a horizontal position, as shown in FIG. 12, and can also be further rotated to hang straight down, as shown in FIG. 13.

When it is desired to remove the tail gate 3 from the loading bed 1, the tail gate 3 is rotated to the installation-removal position and then, by lifting up in the upper rear direction, the left and right projecting members 11 will pass through the slot 27 and may be removed from the support members 9.

At that time, the gap equivalent to the sum of the heights (2t) of the raised sections 33 is left between the end surfaces 11c of the projecting members 11 and the bottom sections 9b of the support members 9, so that the removal action is easily carried out.

By means of the present invention, the gate is maintained at a specific slant and the projecting member will pass through the slot in the support member and engage the inner part of the support member. By installing the gate on and removing it from the support member, the gate can easily be installed on or removed from the loading bed. In this way, when the gate installed on the loading bed is rotated to the closed position, each of the end surfaces of the projecting member slidingly contacts the raised section on the bottom surface of the support member. This raised section causes the gate to always reverts to a predetermined standard position between the two gate support sections on the loading bed.

Accordingly, when the gate is installed or removed, the play or gap in the engaging sections is substantially equivalent to the sum of the heights of the raised sections. Further, this play disappears, that is, there is no play when the gate is moved to the closed position, and the gate is accurately maintained in the standard position, firmly held between the two raised sections.

When the gate is installed on or removed from the loading bed, the engaging section has adequate play so that installation or removal of the gate is easily performed. However, when the gate is moved to the closed position, the play between the gate and the gate support sections on the loading bed disappears and the gate can be maintained in a fixed position. Accordingly, the present invention has many merits, such as the elimination of rattles between the tail gate and the loading bed, and elimination of incomplete meshing of the gate lock mechanism.

The present invention is not limited to the embodiments described above. Many modifications are possible. For example, in the first embodiment, the insertion slot 27 in the holding section 9a need not necessarily be provided on both sides of the holding section 9a, but can be provided on one side only. In addition, it is acceptable to provide the projecting member 11 on the chassis 7 and the support member 9 on the tail gate 3. In this type of configuration, after the projecting member 11 is dropped into the insertion slot 27 of the support member 9 from above in an inclined direction, the support member 9 and the projecting member 11 are engaged in a freely rotatable manner. In the second embodiment, the projecting member 11 is provided on the side of the tail gate 3, and the support member 9 is provided on the side of the gate supporting section 1c on the loading bed, but these may be reversed, with the projecting member provided on the gate supporting section side, and the support member 9 provided on the tail gate side, with the same operation and results being obtained.

In addition, instead of the fixed side plates 16, the opening and closing type of side plates can be provided with the same results.

What is claimed is:

1. A hinge structure for a vehicle comprising:
   a projection member having an oblong top surface, a first pair of arcuate side surfaces and a second pair of side surfaces, and
   a support member for rotatably holding said projection member comprising a substantially annular wall portion and a bottom portion, said wall portion having an inner surface to mate with said first pair of arcuate side surfaces, said bottom portion having an inner surface to mate with said top surface, said wall portion having a cutout directed at a predetermined angle above from the horizontal direction and said cut-out having a size larger than the distance between said second pair of side surfaces, but smaller than the distance between said first pair of arcuate side surfaces,
   wherein said projection member is integrally formed with a first base plate to be secured to a first vehicle member, and said support member is integrally formed with a second base plate to be secured to a second vehicle member, whereby said first vehicle member is removably connected to said second vehicle member through said hinge structure,
   wherein said support member is connected to said second base plate through rivet means with a head portion projecting from said bottom portion, said projection member having a recessed portion at said top surface to receive said head portion.

2. The hinge structure of claim 1, wherein a buffer member is disposed on said inner surfaces of said wall portion and of said bottom portion including said head portion.

3. A hinge structure for a vehicle comprising:
   a projection member having an oblong top surface, a first pair of arcuate side surfaces and a second pair of side surfaces, and
   a support member for rotatably holding said projection member comprising a substantially annular wall portion and a bottom portion, said wall portion having an inner surface to mate with said first pair of arcuate side surfaces, said bottom portion having an inner surface to mate with said top surface, said wall portion having a cutout directed at a predetermined angle above from the horizontal direction and said cut-out having a size larger than the distance between said second pair of side surfaces, but smaller than the distance between said first pair of arcuate side surfaces,
   wherein a pair of arcuate raised portions each formed on an outer periphery portion of said bottom portion except for the location of said cut-out and the location diametrically opposite to said cut-out to mate with said top surface of said projection member adjacent to said first pair of arcuate side surfaces, wherein there is substantially no gap between said top surface of said projection member and said raised portion of said support member.

4. The hinge structure of claim 3, wherein said arcuate raised portion has a slant portion on either end thereof.

5. A hinge structure for a vehicle comprising a projection member having a shape formed by eliminating from a cylindrical body a pair of diametrically opposed arcuate portions, and a support member comprising a substantially annular wall portion with a slot in a C-shape and a bottom portion to define a substantially cylindrical volume therein, said volume being sized to fit to said projection member, wherein said elimination of said pair of opposed arcuate portions enables the insertion of said projection member through said slot into said support member,
   wherein said projection member is integrally formed with a first base plate to be secured to a first vehicle member, and said support member is integrally formed with a second base plate to be secured to a second vehicle member, whereby said first vehicle member is removably connected to said second vehicle member through said hinge structure,
   wherein said support member is connected to said second base plate through a rivet means with a head portion projecting from said bottom portion, said projection member having a recessed portion at said top surface to receive said head portion.

6. The hinge structure of claim 5, wherein a buffer member is disposed on said inner surfaces of said wall portion and of said bottom portion including said head portion.

7. A hinge structure for a vehicle comprising a projection member having a shape formed by eliminating from a cylindrical body a pair of diametrically opposed arcuate portions, and a support member comprising a substantially annular wall portion with a slot in a C-shape and a bottom portion to define a substantially cylindrical volume therein, said volume being sized to fit to said projection member, wherein said elimination of said pair of opposed arcuate portions enables the insertion of said projection member through said slot into said support member,
   wherein a pair of arcuate raised portions each formed on an outer periphery portion of said bottom portion except for the location of said slot and the location diametrically opposite to said slot to mate with said top surface of said projection member adjacent to said first pair of arcuate side surfaces, wherein there is substantially no gap between said top surface of said projection member and said raised portion of said support member.

8. The hinge structure of claim 7, wherein said arcuate raised portion has a slant portion on either end therof.

9. A hinge structure for a gate to be mounted to a loading bed for a truck comprising a projecting shaft having a sideflattened ovaloid cross-section, and a support member in the shape of a tube with a bottom, which engages the projecting shaft in a relatively freely rotating manner, said projecting shaft secured to a first vehicle member and said support member secured to a second vehicle memer; and a slot provided in one part of a cylindrical section on the support member and faced in a predetermined direction, through which the projecting shaft can pass only when the gate is positioned at a specific inclined position relative to the loading bed, so that removal is obtained in the side direction from the support member; and said tubular support member having a raised section on the bottom section thereof, wherein, when said gate is in a closed position, said raised section slidingly contacts the end surface of the projecting shaft, and when the gate is in said inclined position, said raised section is removed from the end surface of the projecting shaft.

10. A hinge structure for a vehicle comprising:

first engaging means disposed in a side portion of a tail gate;

second engaging means disposed in a side board of a chassis, said first and second engaging means being rotatably engaged with each other, one of the first and second engaging means having a projecting member, the other of the first and second engaging means having a support member which receives and supports the projecting member and has a notch into which the projecting member is inserted at a predetermined slanting angle with respect to the vertical direction; and protruding means disposed in a bottom portion of the support member such that the protruding means is engaged with the projecting member when the tail gate is located in a closed position and the protruding means is disengaged from the projecting member when the tail gate is located in a slanting position in which the projecting member is inserted into said notch at said predetermined slanting angle.

11. A hinge structure as claimed in claim 10, wherein said projecting member is disposed in the first engaging member and has an elongated shape in cross section.

12. A hinge structure as claimed in claim 10, wherein said protruding means comprises a protruding portion projected from the bottom surface of the support member with a clearance between the end tip of the projecting member and the bottom surface of the support member.

* * * * *